United States Patent [19]

Arai et al.

[11] Patent Number: 4,539,859
[45] Date of Patent: Sep. 10, 1985

[54] SHIFT MECHANISM IN A MANUAL TRANSMISSION

[75] Inventors: Hajime Arai, Aichi; Shozi Haga; Tadashi Nozaki, both of Toyota, all of Japan

[73] Assignee: Toyota Jidosha Kabushiki Kaisha, Aichi, Japan

[21] Appl. No.: 421,436

[22] Filed: Sep. 22, 1982

[30] Foreign Application Priority Data

Oct. 20, 1981 [JP] Japan .................. 56-156721[U]

[51] Int. Cl.³ .................. B60K 20/00; G05G 5/10; G05G 9/02; G05G 5/06
[52] U.S. Cl. ......................... 74/475; 74/477; 74/473 R; 74/531
[58] Field of Search ............. 74/475, 477, 527, 473 R, 74/531; 403/328, 327; 24/606, 613, 453

[56] References Cited

U.S. PATENT DOCUMENTS

| | | | |
|---|---|---|---|
| 2,529,741 | 11/1950 | Roberts | 74/473 |
| 2,897,685 | 8/1959 | Thannhauser | 74/473 |
| 2,998,730 | 9/1961 | Raskhodoff et al. | 74/531 |
| 3,106,851 | 10/1963 | Ivanchich | 74/475 |
| 3,541,879 | 11/1970 | Ravenel | 74/477 |
| 3,581,594 | 6/1971 | Longshore | 74/475 |
| 3,857,299 | 12/1974 | Morrison | 74/475 X |
| 3,945,201 | 3/1976 | Entringer | 74/531 X |
| 4,031,977 | 6/1977 | Grosseau | 74/475 X |
| 4,277,983 | 7/1981 | Izumi et al. | 74/477 |

FOREIGN PATENT DOCUMENTS

| | | | |
|---|---|---|---|
| 1036680 | 8/1958 | Fed. Rep. of Germany | 74/475 |
| 1408609 | 10/1975 | United Kingdom | 74/531 |
| 2089451 | 6/1982 | United Kingdom | 74/475 |

Primary Examiner—Allan D. Herrmann
Assistant Examiner—Stephen B. Andrews
Attorney, Agent, or Firm—Parkhurst & Oliff

[57] ABSTRACT

Disclosed herein is a shift mechanism in a manual transmission having a detent mechanism which comprises a cylindrical holder provided with an opening at its one end, a detent ball accommodated in the holder at the opening and adapted to contact with one of detent grooves, and a compression spring accommodated in the holder and adapted to bias the detent ball against one of the detent grooves. The opening of the holder is inwardly bent at its circumferential edge to form a ball retaining portion for projecting a part of the detent ball therefrom and retaining the detent ball so as not to come out from the opening.

2 Claims, 3 Drawing Figures

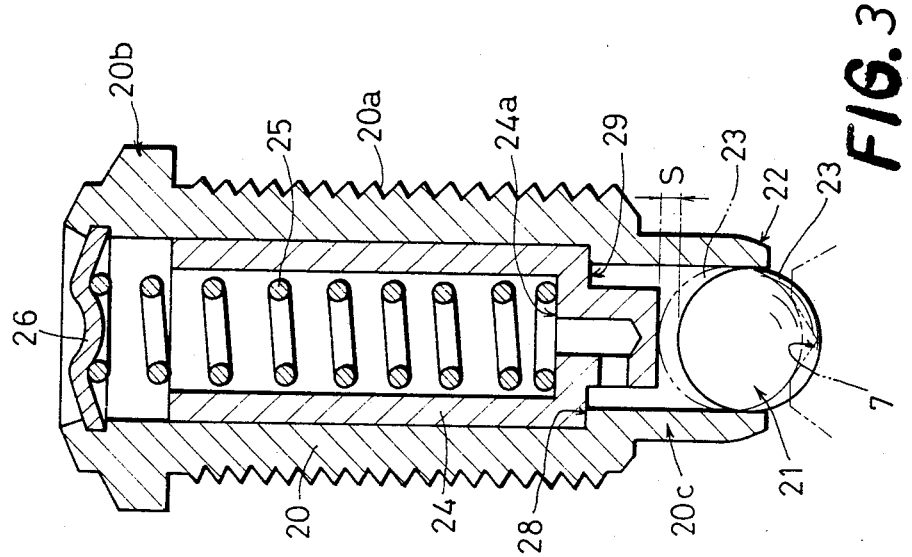
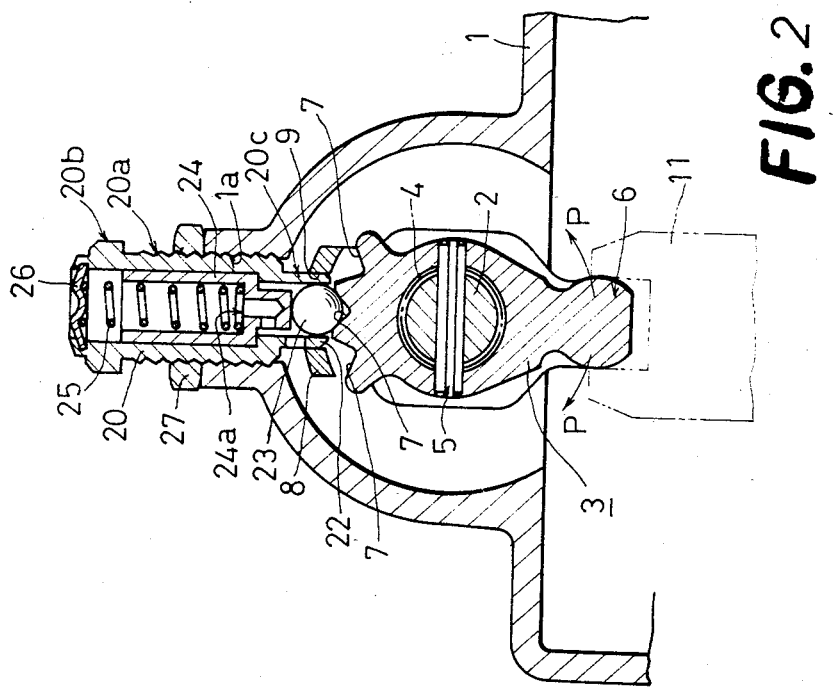

SHIFT MECHANISM IN A MANUAL TRANSMISSION

BACKGROUND OF THE INVENTION

This invention relates to a shift mechanism in a manual transmission for an automobile, and more particularly to a shift mechanism which cooperates with a detent mechanism for shift-operation carried on a part of a shift-and-select lever incorporated in a transmission casing.

A shift mechanism in the prior art cooperating with such a detent mechanism includes detent grooves formed on a part of the shift-and-select lever and a detent pin or a detent ball biased from the transmission casing side against one of the detent grooves by a spring. Especially, the detent mechanism including a detent ball rather than a detent pin accomplishes a smooth shift-operation because of easiness of rolling motion of the detent ball. In the case that a detent ball and a spring are accommodated in a single holder which is mounted to the transmission casing, it is advantageous in handling the holder and mounting it on the transmission casing for the detent ball, the spring and the holder to be assembled as a single unit so that the detent ball and the spring may not come out from the holder. In order to meet the requirements, an opening formed in a part of the holder and adapted to project a part of the detent ball therefrom should be deformed by crimping, for example, to form a ball retaining means. However, with this arrangement, the detent ball is brought into surface-contact with an inner surface of the ball retaining means, and as the result, smooth rolling motion of the detent ball may be hindered.

SUMMARY OF THE INVENTION

Accordingly, a primary object of the present invention is to provide a shift mechanism cooperating with a detent mechanism in a manual transmission which enables a detent ball engaging with the detent mechanism to smoothly roll and affords a good feeling of shift-operation.

Another object of the present invention is to provide a shift mechanism in a manual transmission wherein a detent ball, a spring and a holder are assembled so as to handle these elements as a single unit for the detent mechanism.

A further object of the present invention is to provide a shift mechanism in a manual transmission wherein the detent ball may be lifted from the ball retaining portion of the holder so that the outer periphery of the ball may be held in linear-contacting condition with the inner periphery of the holder, after installation of the holder into the transmission casing.

According to the present invention, a shift mechanism in a manual transmission includes a shift-and-select lever shaft adapted to rotate about its axis by shift-operation of a speed change lever which is shiftable from a neutral position to two shift positions, a shift-and-select lever fixed to the shift-and-select lever shaft and provided with an engagement portion at its lower end for engaging shift heads and with detent grooves at its upper end for determining one of each shift position and the neutral position, a cylindrical holder provided with an opening at its one end so as for the opening to be directed to the detent grooves, a detent ball accommodated in the holder at the opening and adapted to contact with one of the detent grooves, and a compression spring accommodated in the holder and adapted to bias said detent ball against one of said detent grooves. The opening of the holder is inwardly bent at its circumferential edge to form a ball retaining portion for projecting a part of the detent ball therefrom and retaining the detent ball so as not to come out from the opening. Under the mounting condition of the holder to the transmission casing, the detent ball is slightly lifted from the ball retaining portion when the detent ball is brought into engagement with one of the detent grooves of the shift-and-select lever.

Various general and specific objects, advantages and aspects of the invention will become apparent when reference is made to the following detailed description of the invention considered in conjunction with the related accompanying drawings.

BRIEF DESCRIPTION OF THE DRAWINGS

FIG. 2 is a cross-sectional view taken along the line II—II in FIG. 1; and

FIG. 3 is an enlarged cross-sectional view of the holder and the associated elements.

DETAILED DESCRIPTION OF THE PREFERRED EMBODIMENTS

Figure 1:
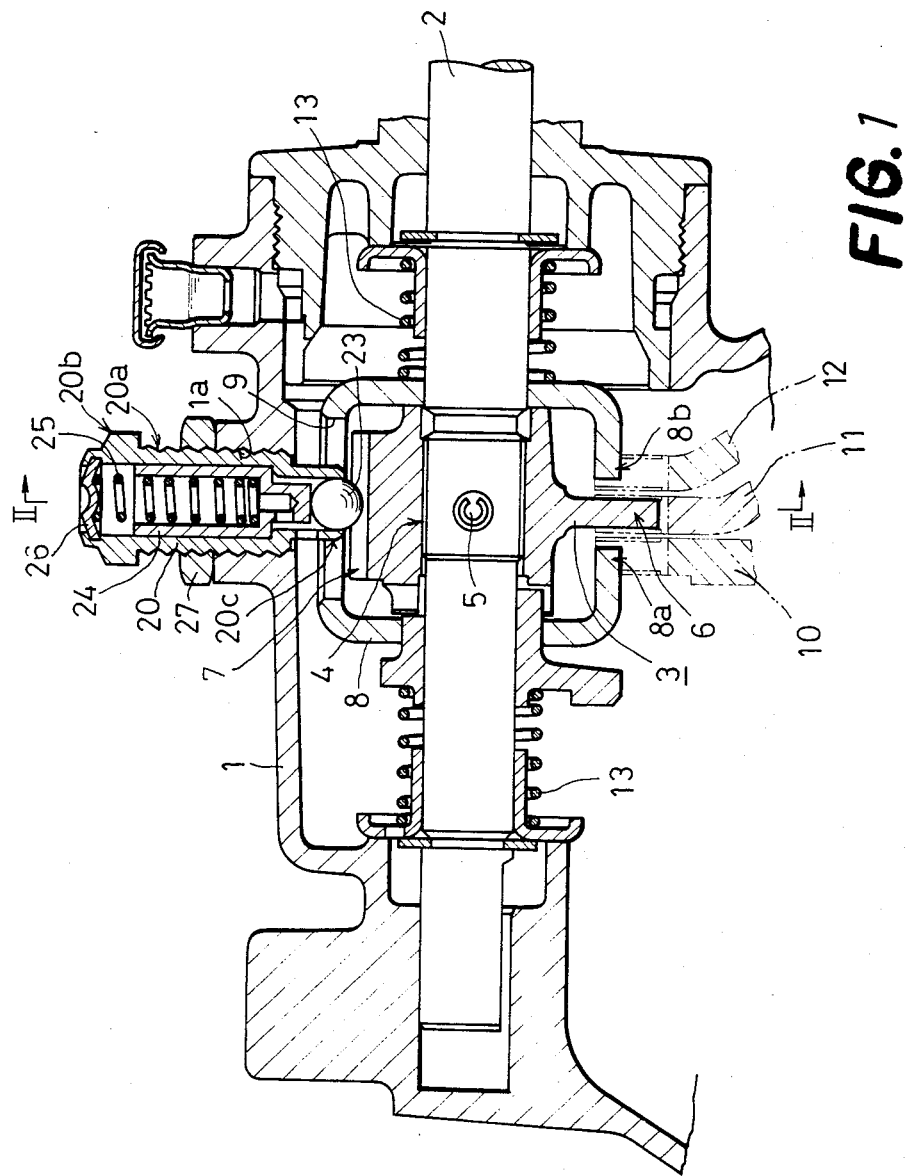
FIG. 1 is a cross-sectional view of the essential part of the shift mechanism according to the preferred embodiment.

Referring now to FIGS. 1 and 2 which illustrate a shift mechanism in a manual transmission for a front engine-front drive type vehicle, a shift-and-select lever shaft 2 is supported at both ends by a transmission casing or a Transaxle casing 1, so as to rotate about its axis and move in its axial direction, that is, the shaft 2 is rotated by a shift-operation of a speed change lever (not shown) and is axially moved by a select-operation of the speed change lever. A shift-and-select lever 3 is fixed on the shaft 2 by a spline 4 and a pin 5, so as to rotate and move together with the shaft 2. The lever 3 is formed in such a manner that its lower part extends downwardly and forms an engagement portion 6 to selectively engage one of shift heads 10, 11 and 12 for each shift fork (not shown). In other words, when the shaft 2 and the lever 3 are moved in the right and the left directions as viewed in FIG. 1 by the select-operation, the engagement portion 6 of the lever 3 is engaged with one of the shift heads 10, 11 and 12. When the shaft 2 and the lever 3 are rotated by the shift-operation, the selected shift head and its shift fork are moved in the right and the left directions as viewed in FIG. 2 to obtain a desired shift position in the transmission.

An interlock plate 8 is provided on the shaft 2 so as to rotate relative to the shaft 2, and is so located as to stride across the lever 3 in the axial direction of the shaft 2 as is apparent from FIG. 1. That is to say, the interlock plate 8 abuts against the right and the left sides of the lever 3 as shown in FIG. 1, and as the results, it may move with the shaft 2 and the lever 3 in the axial direction of the shaft 2 or in the direction of the select-operation. The interlock plate 8 is provided with a pair of engagement members 8a and 8b at its lower portion so as to engage the shift heads 10, 11 and 12. As will be hereinafter described, the interlock plate 8 is prevented from rotating about the axis of the shift-and-select lever shaft 2, so that the shift heads engaged with both engagement members 8a and 8b are held unmovable in the direction of shift-operation.

A detent groove 7 is formed on the upper portion of the lever 3 for determining a neutral position and a desired shift position of a speed change lever (not shown). A threaded hole 1a is formed through the upper wall of the transmission casing 1 at the opposed portion to the detent groove 7. Reference numeral 20 designates a hollow cylindrical holder having a male thread 20a at its outer peripheral surface and a hexagonal head 20b at its top portion. The holder 20 is screwed into the threaded hole 1a. A small diametrical portion 20c is formed at the lower portion of the holder 20. An elongated hole 9 is formed through the upper wall of the interlock plate 8 at the opposed portion to the detent groove 7. The small diametrical portion 20c of the holder 20 is inserted into the elongated hole 9. In other words, the elongated hole 9 is so formed as to permit longitudinal movement of the interlock plate 8 in the axial direction of the shaft 2 (See FIG. 1) and as to prevent rotation of the interlock plate 8 about the axis of the shift-and-select lever shaft 2 as viewed in FIG. 2 by substantially equalizing its width to the outer diameter of the small diametrical portion 20c.

As shown in FIG. 3 illustrating an enlarged view of the holder 20, a detent ball 23 is accommodated in the holder 20 and a part of the detent ball 23 is projected from the opening 21 formed at the lower end of the holder 20. The opening 21 is designed in such a manner that its inner circumferential edge is inwardly bent by crimping, for example, so as to prevent the ball 23 from coming out from the holer 20 and to form a ball retaining portion 22. A hollow plunger or a spring seat 24 is inserted into the holder over the ball 23. The spring seat 24 has a stepped stopper surface 29 at its lower end. A stepped portion 28 is formed on the inside wall of the lower portion of the holder 20 so as to abut against the stopper surface 29, thereby adjusting the position of the spring seat 24 relative to the holder 20. With this arrangement, the lower end surface of the spring seat 24 is adapted to contact with the ball 23 after mounting of the holder 20 to the transmission casing 1. A compression spring 25 is accommodated in the spring seat 24 between the inside bottom end 24a of the seat 24 and a washer 26 secured on the upper portion of the holder 20. Thus, the stopper surface 29 of the seat 24 is biased onto the stepped portion 28 of the holder 20 by resilient force of the compression spring 25.

In operation, when the engagement portion 6 of the shift-and-select lever 3 is in engagement with the middle shift head 11 for a third-fourth speed gears, the remaining shift heads 10 and 12 engage interlocking portions 8a and 8b of the interlock plate 8, respectively, thereby permitting a shift-operation of the shift head 11. When the shift-and-select lever 3 is select-operated, that is, moved leftwardly as viewed in FIG. 1 and is engaged with the shift head 10 for a first-second speed gears, the interlock plate 8 is also moved in the same direction, and as the result, the interlocking portion 8a is disengaged from the shift head 10 and another interlocking portion 8b is engaged with the remaining shift heads 11 and 12, thereby permitting shift-operation of the shift head 10. On the contrary, when the lever 3 is moved rightwardly as viewed in FIG. 1 and is engaged with the shift head 12 for a fifth-reverse speed gears, the interlocking portion 8a is engaged with the shift heads 10 and 11 and another interlocking portion 8b is disengaged from the shift head 12, thereby permitting shift-operation of the shift head 12. Reference numeral 13 designates a pair of select return springs provided on the shaft 2. The shaft 2, lever 3 and interlock plate 8 are biased by the resilient force of the spring 13 so as to normally hold the speed change lever (not shown) at its neutral position.

According to this embodiment, the holder 20, detent ball 23, spring seat 24 and compression spring 25 are assembled as a single unit to form a detent mechanism. As shown in FIG. 3, before mounting of the holder 20 to the transmission casing 1, a predetermined clearance S is defined between the ball 23 retained by the ball retaining portion 22 of the holder 20 and the lowermost end of the spring seat 24. After mounting of the holder 20 to the transmission casing 1, the ball 23 is lifted by the detent groove 7 of the shift-and-select lever 3 up to the level as depicted by a phantom line. Under these conditions, the ball 23 is in the released position from the ball retaining portion 22 of the holder 20 and thus, the ball 23 is brought into linear-contact with the inner circumference of the small diametrical portion 20c of the holder 20. At this time, the spring seat 24 is adjusted by the stopper surface 29 abutting against the stepped portion 28 of the holder 20 and as the result, no resilient force of the spring 25 is applied to the ball 23.

As shown in FIGS. 1 and 2, the holder 20 is threaded into the threaded hole 1a of the transmission casing 1 and thereafter, a lock nut 27, which is previously threadedly inserted onto the holder 20, is screwed to the casing 1, so as to fasten the holder 20 thereto. When the lever 3 is rotated in the directions as depicted by arrows P in FIG. 2 by the shift-operation, the detent ball 23 is lifted by the convex portion of the detent groove 7, and the spring seat 24 is also lifted against the biasing force of the spring 25, and as the result, the ball 23 is rotated and received in another detent groove 7. With the aid of this operation, the function for holding the speed change lever on one of its shift positions and the neutral position may be accomplished, and good feeling of the shift-operation may be obtained. Moreover, according to this mechanism, in each shift position and the neutral position of the speed change lever, the detent ball 23 is released or lifted from the ball retaining portion 22 of the holder 20 and the ball 23 is not influenced by resilient force of the spring 25. Accordingly, during shift-operation, the ball 23 may smoothly roll and especially at the early stage of the shift-operation, resistance of the rolling may be minimized.

Having thus described the preferred embodiments of the invention it should be understood that numerous structural modifications and adaptations may be restored to without departing from the spirit of the invention.

What is claimed is:

1. In combination with a manual transmission for an automobile having a transmission casing, a shift-and-select lever shaft mounted on said transmission casing so as to move axially and rotate about its axis, a shift-and-select lever fixed to said shift-and-select lever shaft and provided with an engagement portion at its lower end for engaging with shift heads which can take two shift positions and a neutral position and provided with detent grooves at its upper end, a detent mechanism comprising:

a cylindrical holder provided with an opening at its one end and removably mounted on said transmission casing such that said opening is directed towards said detent grooves;
   a detent ball accommodated in said holder at said opening and having a diameter greater than an inner diameter of said opening, said detent ball being in tangential contact with said holder and adapted to engage with one of said detent grooves for determining a shift position of said shift heads, said opening being provided with a ball retaining portion comprising an inwardly bent circumferential edge of said holder at said opening for allowing a part of said detent ball to project from said opening while preventing said detent ball from coming out from said opening, and said holder being installed in said transmission casing in such a manner that said detent ball is slightly lifted from said ball retaining portion when said detent ball is brought into contact with one of said detent grooves of said shift-and-select lever;

a compression spring accommodated in said holder and adapted to bias said detent ball against said detent grooves; and a spring seat disposed within said holder for receiving a resilient force of said compression spring, said spring seat being slidable in and abuttable at its lowermost position against said holder in such a manner that when said detent ball engages with said detent grooves of said shift-and-select lever, said spring seat is in its lowermost position and said detent ball engages the lowermost end of said spring seat without receiving the resilient force of said compression spring.

2. The detent mechanism as defined in claim 1, wherein said spring seat is formed as a hollow plunger and is provided with a stopper surface formed on the outside circumference thereof, and said holder is provided with a stepped portion formed on the inside circumference thereof, said spring seat being positioned relative to said holder in such a manner that said stopper surface abuts against said stepped portion when said spring seat is in its lowermost position.

* * * * *